(12) United States Patent
Mercx et al.

(10) Patent No.: US 8,003,016 B2
(45) Date of Patent: Aug. 23, 2011

(54) THERMOPLASTIC COMPOSITION WITH IMPROVED POSITIVE TEMPERATURE COEFFICIENT BEHAVIOR AND METHOD FOR MAKING THEREOF

(75) Inventors: Franciscus Petrus Maria Mercx, Bergen op Zoom (NL); Sascha ter Horst, Visarend (NL)

(73) Assignee: SABIC Innovative Plastics IP B.V. (NL)

( * ) Notice: Subject to any disclaimer, the term of this patent is extended or adjusted under 35 U.S.C. 154(b) by 233 days.

(21) Appl. No.: 12/237,595

(22) Filed: Sep. 25, 2008

(65) Prior Publication Data

US 2009/0236565 A1    Sep. 24, 2009

Related U.S. Application Data

(60) Provisional application No. 60/975,836, filed on Sep. 28, 2007.

(51) Int. Cl.
*H01B 1/00* (2006.01)
*H01B 1/06* (2006.01)
*H01B 1/02* (2006.01)
*H01C 7/10* (2006.01)
*H01C 7/13* (2006.01)

(52) U.S. Cl. ........ 252/511; 252/500; 252/512; 338/22 R; 338/22 SD

(58) Field of Classification Search ............... 252/500, 252/511, 512; 338/22 R, 22 SD
See application file for complete search history.

(56) References Cited

U.S. PATENT DOCUMENTS

| | | | | |
|---|---|---|---|---|
| 4,668,857 A | * | 5/1987 | Smuckler | 219/549 |
| 4,780,598 A | * | 10/1988 | Fahey et al. | 219/511 |
| 4,859,836 A | * | 8/1989 | Lunk et al. | 219/548 |
| 5,651,922 A | * | 7/1997 | Nahass et al. | 252/511 |
| 6,197,219 B1 | | 3/2001 | Foulger | |
| 6,218,928 B1 | * | 4/2001 | Okada et al. | 338/22 R |
| 6,238,598 B1 | * | 5/2001 | Chen | 252/512 |
| 6,359,544 B1 | * | 3/2002 | Blok | 338/22 R |
| 6,396,384 B1 | | 5/2002 | Blok et al. | |
| 6,479,575 B1 | | 11/2002 | Chu et al. | |
| 2002/0183438 A1 | | 12/2002 | Amarasekera | |
| 2004/0039096 A1 | | 2/2004 | Patel | |
| 2004/0169162 A1 | | 9/2004 | Xiao et al. | |
| 2004/0262581 A1 | | 12/2004 | Rodrigues | |

(Continued)

FOREIGN PATENT DOCUMENTS

| | | |
|---|---|---|
| EP | 0853322 | 7/1998 |
| WO | 0109905 | 2/2001 |
| WO | 0237507 | 5/2002 |

(Continued)

OTHER PUBLICATIONS

Feng et al. "Carbon-Black Filler Immiscible Blends of Poly(Vinylidene Fluoride) and High Density Polyethylene: The Relationship Between Morphology and Positive and Negative Temperature Coefficient Effects," Poly. Engr. and Sci. 39(7), pp. 1207-1215 (Jul. 1999).*

*Primary Examiner* — Mark Kopec
*Assistant Examiner* — Jaison P Thomas

(57) ABSTRACT

The present invention relates to a thermoplastic resin composition that includes a first phase polymeric material, at least one conductive filler and a second phase polymeric material where in the first phase polymer and second phase polymer are in co-continuous in nature and said conductive composition exhibits positive temperature coefficient behavior. The invention also relates to a method of making a co-continuous conductive composition that exhibits positive temperature coefficient behavior.

19 Claims, 4 Drawing Sheets

| U.S. PATENT DOCUMENTS | | | | FOREIGN PATENT DOCUMENTS | | |
|---|---|---|---|---|---|---|
| 2005/0067406 A1 | 3/2005 | Rajarajan | | WO | 0242372 | 5/2002 |
| 2005/0112331 A1 | 5/2005 | Donea | | WO | 0245098 | 6/2002 |
| 2006/0135668 A1 | 6/2006 | Hayes | | WO | 2006029145 | 3/2006 |
| 2007/0187655 A1* | 8/2007 | Wang et al. | 252/511 | * cited by examiner | | |

THERMOPLASTIC COMPOSITION WITH IMPROVED POSITIVE TEMPERATURE COEFFICIENT BEHAVIOR AND METHOD FOR MAKING THEREOF

CROSS REFERENCE TO RELATED APPLICATIONS

The present application claims priority to U.S. Provisional Application No. 60/975,836, filed Sep. 28, 2007, which is hereby incorporated in its entirety.

FIELD OF THE INVENTION

The present invention is directed to a co-continuous conductive thermoplastic composition that has a positive temperature coefficient (PTC) characteristics and has a Heat Distortion temperature (HDT) higher than the trip temperature of the PTC material.

BACKGROUND OF INVENTION

It is well known that polymers can be made electrically conductive by dispersing therein suitable amounts of conductive particulate fillers such as carbon black or fine metal particles. Over recent years, there has been particular interest in such compositions that exhibit positive temperature coefficient (PTC) characteristics, i.e., which show a very rapid increase in resistivity over a particular temperature range.

PTC materials are conductive materials characterized by a sharp increase in resistivity upon reaching a switching temperature (Ts). If the jump in resistivity is sufficiently high, the resistivity effectively blocks the current and further heating of the material such that overheating of the material is prevented. One of the main benefits of PTC materials is that no additional electronic circuits are necessary in an article that includes a PTC material since the PTC material itself has a characteristic similar to electronic circuits. Moreover, upon cooling, the material resets itself. This jump in resistivity may oftentimes be referred to as the PTC amplitude and may be defined as the ratio of the maximum volume resistivity to the volume resistivity at room temperature (app. 23° C.).

PTC compositions have been used as a circuit protection device for limiting the current flow when a short-circuiting has taken place in the circuit comprising a heater, a positive character thermistor, a thermo-responsive sensor, a battery or the like, and for resetting the circuit to a normal state when the cause of the short-circuiting is removed.

An alternative use of PTC compositions is a PTC device, in which more than two electrodes are electrically connected to the PTC composition. The electrodes are connected to a power supply so that the current can flow through the PTC device. The PTC device is used as a protecting device for a circuit from current overload, overheating and the like, by functioning as a self-temperature controller as described above. By functioning as a self-controller point towards the use as a self-controlled heater rather than circuit protector.

Compositions exhibiting PTC behavior have been used in electrical devices as over-current protection in electrical circuits comprising a power source and additional electrical components in series. Under normal operating conditions in the electrical circuit, the resistance of the load and the PTC device is such that relatively little current flows through the PTC device. Thus, the temperature of the device remains below the critical or trip temperature. If the load is short circuited or the circuit experiences a power surge, the current flowing through the PTC device increases greatly. At this point, a great deal of power is dissipated in the PTC device. This power dissipation only occurs for a short period of time (fraction of a second), however, because the power dissipation will raise the temperature of the PTC device to a value where the resistance of the PTC device has become so high, that the current is limited to a negligible value. The device is said to be in its "tripped" state. The negligible or trickle through current that flows through the circuit will not damage the electrical components which are connected in series with the PTC device. Thus, the PTC device acts as a form of a fuse, reducing the current flow through the short circuit load to a safe, low value when the PTC device is heated to its critical temperature range. Upon interrupting the current in the circuit, or removing the condition responsible for the short circuit (or power surge), the PTC device will cool down below its critical temperature to its normal operating, low resistance state. The effect is a resettable, electrical circuit protection device.

PTC materials have also been utilized in self-controlled heaters. When connected to a power source, the PTC material will heat up to the trip temperature and maintain this temperature without the use of any additional electronic controllers.

U.S. Pat. No. 6,479,575 discloses the use of two types of polymers that have either similar or dissimilar molecular structures and preferably at least two types of carbon blacks, and to electrical devices containing such compositions. U.S. Pat. No. 6,277,303 discloses an immiscible blend of at least two polymers that phase separate into two continuous morphologies and invention exploits the aspects of percolation theory in developing very low conductive filler content conductive polymeric materials.

Most polymeric PTC materials are based on semi-crystalline polymers with conductive fillers like carbon black, graphite, metal powders and or ceramic powders. One of the draw back of these systems is that the PTC effect occurs at or close to the onset of melting of polymer which results in the volume expansion and the corresponding dilution of the conducting filler in the polymer. The application of these PTC materials is limited as the heat deflection temperature of these materials is less than the trip temperature of the PTC material.

The present invention improves on the prior art by investigating the need for a composition exhibiting positive temperature coefficient (PTC) that has high distortion temperatures. Applicants have found that this can be achieved by the use of a co-continuous blend composition in which one of the phases is a PTC material and the other phase a non-conductive composition with a heat distortion temperature higher than the trip temperature of the PTC material, characterized that the co-continuous blend composition has a heat distortion temperature higher than the PTC trip temperature.

BRIEF DESCRIPTION OF THE INVENTION

The present invention includes a co-continuous conductive thermoplastic composition including a first phase that is conductive and has PTC characteristics and a second phase that is non-conducting and where the HDT of this material/composition is higher than the trip temperature of the phase consisting of the PTC material. Moreover the HDT of the total blend composition is higher than the trip temperature of the PTC material.

The present invention also includes a method for making a co-continuous conductive thermoplastic composition that exhibits positive temperature coefficient behavior. The method includes the step of dispersing a conductive filler in first phase of a polymeric material and blending the blend composition with a non-conductive polymeric material.

In another embodiment, the invention relates to a composition exhibiting positive temperature coefficient behavior formed by first blending a conductive filler with at least a first phase polymeric resin, and compounding the blend of conductive polymer and the first phase polymeric resin with a second phase polymeric resin, wherein the conductive composition has a trip temperature less than the heat deflection temperature of the overall composition.

In another embodiment, the invention relates to a composition exhibiting positive temperature coefficient behavior formed by first blending a conductive filler with at least a first polymeric resin, and compounding the blend of conductive polymer and the first polymer with a second polymeric resin, the second polymeric resin, wherein the difference between the trip temperature and the heat deflection temperature of the composition is 10° C. or greater. In another embodiment, difference between the trip temperature and the heat deflection temperature of the composition is 15° C. or greater.

In one embodiment of the present invention, the present invention provides a conducting polymer composite material including a first phase material including a semi-crystalline polymer, at least one conductive filler material dispersed in the first polymeric material in an amount sufficient to be equal to or greater than an amount required to generate a continuous conductive network in said first phase material; and a second phase material, the second phase material being a polymer that, when mixed with said first phase material, will not engage in electrostatic interactions that promote miscibility, the material being capable of exhibiting positive temperature coefficient behavior.

In one embodiment, the invention relates to a composition exhibiting positive temperature coefficient behavior formed by first blending at least one conductive filler with at least a first polymeric resin, mixing the blend of conductive filler and the polymer with at least a second polymeric resin, the second polymeric resin being different from the first polymeric resin, whereas the two polymers have different heat distortion temperature In one embodiment, the invention relates to a composition exhibiting positive temperature coefficient behavior formed by first blending at least one conductive filler with at least a first polymeric resin, mixing the blend of conductive filler and the polymer with at least a second polymeric resin, the second polymeric resin being different from the first polymeric resin, whereas the heat deflection temperature of second polymeric resin is higher than the first polymeric resin.

In another embodiment of the invention, the invention relates to a composition exhibiting a positive temperature coefficient behavior formed by first blending at least one conductive filler with at least a first polymeric resin, mixing compounding the blend of conductive filler and the polymer with at least a second polymeric resin, the second polymeric resin being the same or different from the first polymeric resin to form a composition with distinct phases, whereas the heat deflection temperature of second polymeric phase is higher than the first polymeric material.

In another embodiment, the invention relates to a composition exhibiting positive temperature coefficient behavior formed by first blending at least one conductive filler with at least a first polymeric resin, and mixing the blend of conductive polymer and the first polymeric resin with a second phase polymeric resin, the second polymeric resin being the same or different from the first polymeric resin, whereas the heat deflection temperature of overall polymeric system is higher than the heat deflection temperature of the first polymeric resin/conductive filler blend.

In yet another embodiment, the invention relates to a composition exhibiting positive temperature coefficient behavior formed by blending at least one conductive filler with at least a first polymeric resin, and a second phase polymeric resin, the second polymeric resin being the same or different from the first polymeric resin, whereas the heat deflection temperature of overall polymeric system is higher than the heat deflection temperature of the first polymeric resin/conductive filler blend.

In another embodiment of the invention, first phase polymeric material is a PTC material.

In another embodiment, the invention relates to a co-continuous conductive thermoplastic composition that exhibits positive temperature coefficient behavior, wherein the migration of conductive filler from the first phase polymeric material to the second phase polymeric material is substantially reduced.

BRIEF DESCRIPTION OF FIGURES

The behavior of an electrically conducting polymeric composition when subjected to a change in temperature is shown in FIGS. 1 and 2.

DETAILED DESCRIPTION

The terms "a" and "an" herein do not denote a limitation of quantity, but rather denote the presence of at least one of the referenced item. All ranges disclosed herein are inclusive and combinable. Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

As herein, alternating language like "first polymeric material" may be used for "first phase polymeric material" and "second polymeric material" may be used for "second phase polymeric material". The term "first phase polymeric material" refers to at least a polymeric material or a polymeric material that includes fillers or reinforcing agents or compatibilizing agents or any other additives. Similarly, the term "second phase polymeric material" refers to at least a polymeric material or a polymeric material that includes fillers or reinforcing agents or compatibilizing agents or any other additives.

"Positive Temperature Coefficient" (or "PTC") materials are conductive materials characterized by a sharp increase in resistivity upon reaching a switching temperature (Ts). A function/curve of the electrical resistivity with temperature (as shown in FIG. 4) has a positive slope and within this temperature range, the electrically conducting polymeric PTC composition is said to have a positive coefficient of temperature resistance (PCTR).

If the increase in the electrical resistivity at the switching temperature is sufficiently high, it effectively blocks the flow of further electrical current and thus reduces or even prevents overheating of the polymeric composition. This jump in resistivity is generally referred to as the positive temperature coefficient (PTC) amplitude and is often defined as the ratio of the maximum volume resistivity at a selected temperature to the volume resistivity at room temperature (23° C.).

Figure 4:
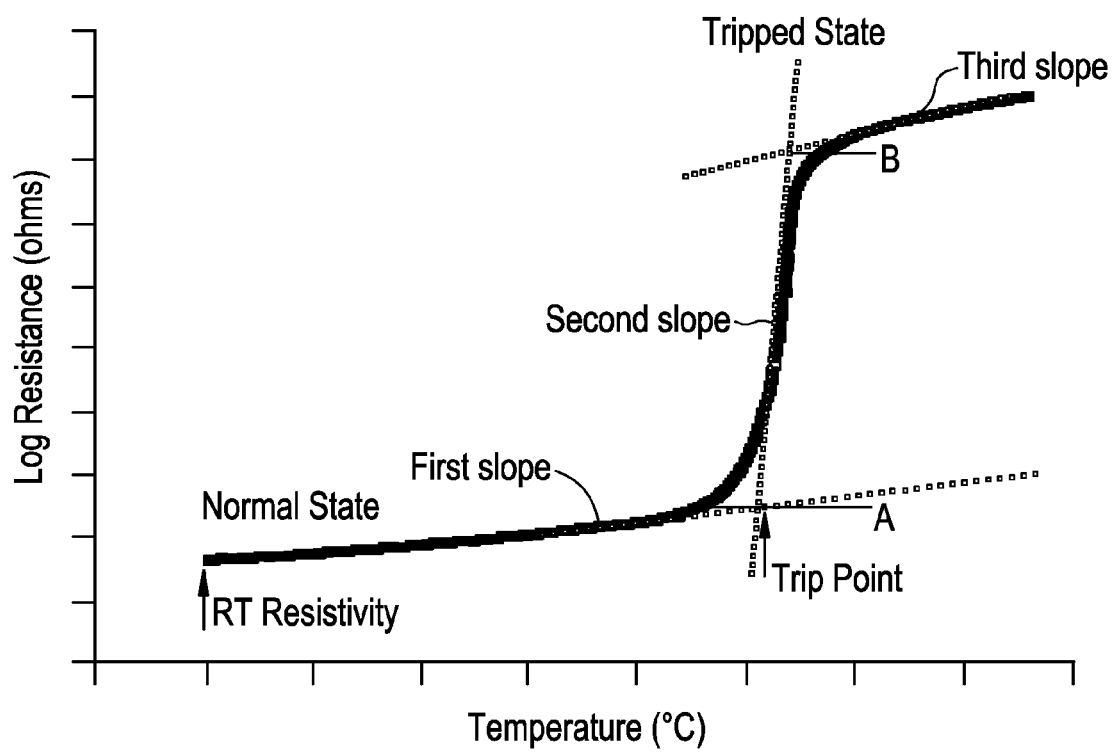
FIG. 4 is an exemplary depiction of the behavior of a electrically conducting polymeric PTC composition when subjected to a change in temperature.

FIG. 4 is an exemplary depiction of the behavior of an electrically conducting polymeric PTC composition when subjected to a change in temperature. FIG. 4 depicts the changes in electrical resistivity when the material is subjected to a change in temperature. The electrical resistivity increases from the bottom to the top of the y-axis. As can be seen at the switching temperature $T_s$, there is a change in resistivity of several orders of magnitude. The switching temperature is indicated by the letter (A) in FIG. 4 at temperatures lower than the switching temperature, the resistivity of the polymeric composition does not change very much with a change in temperature. The slope of the resistivity curve prior to the switching temperature is referred to in FIG. 4 as the first slope. At temperatures greater than the switching temperature, there is an increase in the electrical resistivity of several orders of magnitude with temperature. This is referred to as the second slope. The switching temperature (A) is defined as the intersection of a tangent taken to the first slope with a tangent taken to the second slope. After the resistivity has increased rapidly with temperature for a while, it once again begins to level off and reaches a fairly stable value. This portion of the resistivity curve is referred to as the third slope.

As seen in FIG. 4, a tangent to the second slope intersects with a tangent to the third slope at the point B. The PTC amplitude is defined as the ratio of electrical resistivity at a temperature represented by the intersection of the third slope with the second slope to the electrical resistivity at room temperature (RT). In other words, the positive temperature coefficient (PTC) amplitude is defined as the ratio of the volume electrical resistivity at point B to the volume electrical resistivity at point A.

As used herein, the term "operating temperature" refers to the temperature around which a polymer melts or the temperature around which a polymeric material can be processed.

The present invention includes a co-continuous conductive thermoplastic composition that includes a first phase polymeric material, a conductive filler and a second phase polymeric material wherein the conductive composition is a material having two distinct phases exhibiting positive temperature coefficient (PTC) behavior.

The first phase polymeric material for the present invention is selected in such a way that it is, in one embodiment, crystalline or semi-crystalline in nature. The crystallinity of the material can range from 5% to 95% and, in an alternative embodiment, 70% based on the heat of fusion of a perfect crystal. In an alternative embodiment, the crystallinity of the material is 5% or greater. In yet another embodiment, the crystallinity of the first phase material is 30% or greater. In yet another embodiment, the crystallinity of the first phase material is 60% or greater. In yet another embodiment, the crystallinity of the first phase material is 80% or greater.

In one embodiment, the first phase material is a high-density polyethylene. In another embodiment the first phase polymeric material is a polypropylene. In yet another embodiment the first phase polymeric material is an ethene-octene copolymer. In yet another embodiment the first phase material is a polyester. In yet another embodiment the first phase polymeric material is a polyamide.

In one embodiment, the second phase polymeric material is selected from any crystalline, semi-crystalline or amorphous material provided the material is capable of forming a co-continuous phase with the first phase polymeric material.

In one embodiment, the second phase polymeric material is a non-conductive material. In another embodiment, the second phase polymeric material includes reinforcing fibers. In yet another embodiment, the second phase polymeric material includes flame-retardants. In yet another embodiment, the second phase polymeric material includes reinforcing fibers and flame-retardants.

In one embodiment, the second phase polymeric material is polyamide. In another embodiment the second phase polymeric material is a polyphthalamide. In another embodiment the second phase polymeric material is a liquid crystalline polymer.

In one embodiment, the first phase and second phase material are selected in such a way that heat distortion temperature of the second phase material is higher than the heat distortion temperature of the first phase material. In another aspect of the invention, the heat distortion temperature of the overall composition is higher than the heat distortion temperature of the first phase material.

In one embodiment, heat distortion temperature of the overall composition is higher than the trip temperature of the PTC material.

First phase polymeric material. Examples of first phase materials include, but are not limited to, polyesters such as polyethylene terephthalate, polybutylene terephthalate, polycaprolactone; polyamides such as nylon 6, nylon 66, nylon 11, nylon 12, high temperature nylons, polyolefins such as polyethylene or polypropylene, copolymers (including terpolymers, etc.) of olefins, halogenated vinyl or vinylidene polymers such as polyvinyl chloride, polyvinylidene chloride, polyvinyl fluoride, polyvinylidene fluoride and copolymers of these monomers with each other or with other unsaturated monomers, polyamide copolymers, thermoplastic polyethers, polyphenylene sulfide, polyketones, thermoplastic polyimides, thermoplastic modified celluloses and mixtures including at least one of the foregoing polymeric materials.

Second Phase Polymeric Material. Suitable materials for the second phase material may be any polymerial material that has a heat destortion temperature higher than the first phase polymerc material. Examples of the matrix polymer include, but are not limited to, polyamides (e.g., Nylon 6, Nylon 6/6, Nylon 12, polyaspartic acid, polyglutamic acid, and so forth), polyamines, polyimides, polyacrylics (e.g., polyacrylamide, polyacrylonitrile, esters of methacrylic acid and acrylic acid, and so forth), polycarbonates (e.g., polybisphenol A carbonate, polypropylene carbonate, etc.), polydienes (e.g., polybutadiene, polyisoprene, polynorbornene, etc.), polyepoxides, polyesters (e.g., polyethylene terephthalate, polybutylene terephthalate, polytrimethylene terephthalate, polycaprolactone, polyglycolide, polylactide, polyhydroxybutyrate, polyhydroxyvalerate, polyethylene adipate, polybutylene adipate, polypropylene succinate, etc.), polyethers (e.g., polyethylene glycol (polyethylene oxide), polybutylene glycol, polypropylene oxide, polyoxymethylene (paraformaldehyde), polytetramethylene ether (polytetrahydrofuran), polyepichlorohydrin, etc.), polyfluorocarbons, formaldehyde polymers (e.g., urea-formaldehyde, melamine-formaldehyde, phenol formaldehyde, etc.), natural polymers (e.g., cellulosics, chitosans, lignins, waxes, etc.), polyolefins (e.g., polyethylene, polypropylene, polybutylene, polybutene, polyoctene, etc.), polyphenylenes (e.g., polyphenylene oxide, polyphenylene sulfide, polyphenylene ether sulfone, etc.), silicon containing polymers (e.g., polydimethyl siloxane, polycarbomethyl silane, etc.), liquid crystalline polymers, polyurethanes, polyvinyls (e.g., polyvinyl butryal, polyvinyl alcohol, polyvinyl acetate, polystyrene, polymethylstyrene, polyvinyl chloride, polyvinyl pryrrolidone, polymethyl vinyl ether, polyethyl vinyl ether, polyvinyl methyl ketone, etc.), polyacetals, polyarylates, copolymers (e.g., polyethylene-co-vinyl acetate, polyethylene-co-acrylic acid, polybutylene terphthalate-co-polytetramethylene terephthalate, polylauryllactam-block-polytetrahydrofuran, etc.), and mixtures including at least one of the foregoing polymeric materials.

In another aspect of the invention, first phase polymeric material is a PTC material. In yet another aspect, the first and second polymeric material together form a co-continuous blend that is a PTC material.

In yet another aspect, conductive fillers are blended into a first phase polymer forming a PTC phase, the first polymer may be the same or different from the polymer constituting the second polymeric phase.

In still another aspect, the conductive fillers are blended into a first phase polymer forming a PTC phase; the first polymer may be different from the polymer constituting the second polymeric phase.

In yet another aspect, the first and second polymeric material together forming a co-continuous blend, which is a PTC material, wherein the first polymer and second polymer is compatible to each other.

The first polymer is generally used in amounts of 5 to 95 weight percent (wt %), based on the total weight of the electrically conductive composition. In one embodiment, the first polymer is generally used in amounts of 15 to 90 wt %, based on the total weight of the electrically conductive composition. In another embodiment, the first polymer is generally used in amounts of 30 to 80 wt %, based on the total weight of the electrically conductive composition. In yet another embodiment, the first polymer is generally used in amounts of 35 to 75 wt %, based on the total weight of the electrically conductive composition.

The second polymer is generally used in amounts of 5 to 95 weight percent (wt %), based on the total weight of the electrically conductive composition. In one embodiment, the second polymer is generally used in amounts of 15 to 90 wt %, based on the total weight of the electrically conductive composition. In another embodiment, the second polymer is generally used in amounts of 30 to 80 wt %, based on the total weight of the electrically conductive composition. In yet another embodiment, the second polymer is generally used in amounts of 35 to 75 wt %, based on the total weight of the electrically conductive composition.

Conductive filler Preferably, the electrically conductive fillers are selected from carbon black, a metal, graphite, carbon fibers, conductive ceramic fillers, glass and/or a mineral filler coated with a metal layer, carbon nanotubes, graphitic nanofibers, and/or mixtures including at least one of the foregoing fillers. Exemplary carbon blacks are those having average particle sizes less than 200 nm. In one embodiment, carbon blacks having particle sizes of less than 100 nm are used. In another embodiment, carbon blacks having particle sizes of less than 50 nm are used. In one embodiment, the carbon blacks have surface areas of less than 400 m$^2$/g. In another embodiment, the carbon blacks have surface areas of less than 100 m$^2$/g. Exemplary carbon blacks may have a pore volume (as measured by dibutyl phthalate absorption) less than 200 milliliter per hundred grams ml/100 g), preferably the DBP-absorption is between 50 and 150 ml/100 g. In one embodiment, it is beneficial for the carbon black to have a low ionic content (chlorides, sulfates, phosphates, fluorides, and nitrates) of 4 parts per million per gram (ppm/g) or less.

In one embodiment, the carbon blacks may also have surface areas greater than 200 square meters per gram (m$^2$/g), though this is not a requirement. Examples of carbon blacks that may be used in the present invention include the carbon black commercially available from Degussa under the trade name PRINTEX; the carbon blacks available from Cabot Corp. under the trade names BLACK PEARLS® and MONARCH®; the carbon blacks available from Timcal Ltd. under the trade name ENSACO®, the carbon blacks available from Columbian Chemicals under the trade name RAVEN® respectively.

In select embodiments of the present invention, carbon black is used in amounts of 0.01 to 65 of the total weight of the thermoplastic composition. In one embodiment, carbon black is used in amounts of 0.25 wt % to 50 wt %, based on the total weight of the thermoplastic composition. In another embodiment, carbon black is used in amounts of 1 wt % to 30 wt %, based on the total weight of the thermoplastic composition. In yet another embodiment, carbon black is used in amounts of 2 wt % to 10 wt %.

Formulations containing a sufficient amount of graphite show an improved thermal conductivity which can prevent the formation of hot spots in operation, i.e. when hooked up to a power source. In one embodiments of the present invention, graphite particles are used in combination with the carbon black.

Solid conductive metallic fillers may also be used in the thermoplastic compositions. These may be electrically conductive metals or alloys that do not melt under conditions used in incorporating them into the thermoplastic polymers, and fabricating finished articles there from. Metals such as aluminum, copper, magnesium, chromium, tin, nickel, gold, silver, iron, titanium, or the like, or a combination including at least one of the foregoing metals may be incorporated. Physical mixtures and true alloys such as stainless steels, bronzes, or the like, may also serve as conductive fillers. Conductive ceramic fillers such as boron nitride, alumina, aluminum nitride and silicon carbide can be added to improve the thermal conductive properties and reduce or eliminate the hot spots. In addition, a few intermetallic chemical compounds such as borides, carbides, or the like, of these metals, (e.g., titanium diboride) can also serve as conductive filler particles. Solid non-metallic, conductive filler particles such as tin-oxide, indium tin oxide, antimony oxide, or the like, or a combination including at least one of the foregoing fillers may also be added to render the thermoplastic resins conductive. The solid metallic and non-metallic conductive fillers may exist in the form of powder, drawn wires, strands, fibers, tubes, nanotubes, flakes, laminates, platelets, ellipsoids, discs, and other commercially available geometries.

Regardless of the exact size, shape and composition of the solid conductive metallic and non-metallic conductive filler particles, they may be dispersed into the thermoplastic composition of loadings of 0.01 to 80 wt %, based on the total weight of the thermoplastic composition. In one embodiment, the solid metallic and non-metallic conductive filler particles may be used in amounts of 0.25 wt % to 40 wt %, based on the total weight of the thermoplastic composition. In another embodiment, the solid conductive metallic and non-metallic conductive filler particles may be used in amounts of 0.5 wt % to 30 wt %, based on the total weight of the thermoplastic composition. In yet another embodiment, the solid conductive metallic and non-metallic conductive filler particles may be used in amounts of 1 wt % to 20 wt %, based on the total weight of the thermoplastic composition.

Non-conductive, non-metallic fillers that have been coated over a substantial portion of their surface with a coherent layer of solid conductive metal may also be used in the thermoplastic compositions. The non-conductive, non-metallic fillers are commonly referred to as substrates, and substrates coated with a layer of solid conductive metal may be referred to as "metal coated fillers". Typical conducting metals such as aluminum, copper, magnesium, chromium, tin, nickel, silver, iron, titanium, and mixtures including any one of the foregoing metals may be used to coat the substrates. Examples of such substrates include silica powder, such as fused silica and crystalline silica, boron-nitride powder, boron-silicate powders, alumina, magnesium oxide (or magnesia), wollastonite, including surface-treated wollastonite, calcium sulfate (as its anhydride, dihydrate or trihydrate), calcium carbonate, including chalk, limestone, marble and synthetic, precipitated calcium carbonates, generally in the form of a ground particulates, talc, including fibrous, modular, needle shaped, and lamellar talc, glass spheres, both hollow and solid, kaolin, including hard, soft, calcined kaolin, and kaolin comprising various coatings to facilitate compatibility with the polymeric matrix resin, mica, feldspar, silicate spheres, flue dust, cenospheres, fillite, aluminosilicate, natural silica sand, quartz, quartzite, perlite, tripoli, diatomaceous earth, synthetic silica, and mixtures including any one of the foregoing substrates. All of the above substrates may be coated with a layer of metallic material for use in the thermoplastic compositions.

The metal-coated fillers may be dispersed into the thermoplastic composition of loadings of 0.01 to 80 wt %, based on the total weight of the thermoplastic composition. In one embodiment, the metal-coated fillers may be used in amounts of 0.25 wt % to 50 wt %, based on the total weight of the thermoplastic composition. In another embodiment, the metal-coated fillers may be used in amounts of 0.5 wt % to 30 wt %, based on the total weight of the thermoplastic composition. In yet another embodiment, the metal-coated fillers may be used in amounts of 1 wt % to 10 wt %, based on the total weight of the thermoplastic composition.

Fibrous reinforcement: The composition may optionally further include a filler, including a fibrous filler and/or a low aspect ratio filler. Suitable fibrous fillers may be any conventional filler used in polymeric resins and having an aspect ratio greater than 1. Such fillers may exist in the form of whiskers, needles, rods, tubes, strands, elongated platelets, lamellar platelets, ellipsoids, micro fibers, nanofibers and nanotubes, elongated fullerenes, and the like. Where such fillers exist in aggregate form, an aggregate having an aspect ratio greater than 1 will also suffice for the fibrous filler.

In an exemplary embodiment, glass fibers are used as the non-conductive fibrous fillers in these applications. For example, glass fibers, including E, A, C, ECR, R, S, D, and NE glasses and quartz, and the like. Other suitable inorganic fibrous fillers include those derived from blends including at least one of aluminum silicates, aluminum oxides, magnesium oxides, and calcium sulfate hemihydrate. Also included among fibrous fillers are single crystal fibers or "whiskers" including silicon carbide, alumina, boron carbide, iron, nickel, or copper. Other suitable inorganic fibrous fillers include carbon fibers, aramid fibers, stainless steel fibers, metal coated fibers, and the like.

In other alternative embodiments, commercially produced glass fibers generally having filament diameters of 4.0 to 35.0 micrometers may be included in the electrically conducting polymeric composite. The filaments are made by standard processes, e.g., by steam or air blowing, flame blowing, and mechanical pulling. Exemplary filaments for plastics reinforcement are made by mechanical pulling. The glass fibers may be sized or unsized. Sized glass fibers are generally coated on at least a portion of their surfaces with a sizing composition selected for compatibility with the polymeric matrix material. The sizing composition facilitates wet-out and wet-through of the organic polymer upon the fiber strands and assists in attaining desired physical properties in the composite.

The glass fibers are beneficially glass strands that have been sized. In preparing the glass fibers, a number of filaments can be formed simultaneously, sized with the coating agent and then bundled into a strand. Alternatively the strand itself may be first formed of filaments and then sized. The electrically non-conducting, fibrous, reinforcing fillers may be used in lengths of 0.5 millimeter to 2 centimeters. In one embodiment, the electrically non-conducting, fibrous, reinforcing fillers may be used in lengths of 1 millimeter to 1 centimeter.

In one embodiment, the amount of glass fiber used in the composition may be from 1 to 70 wt. % of the total weight of the composition. In another embodiment, the amount of glass fiber used in the composition may be from 5 to 50 wt. %. In yet another embodiment, the amount of glass fiber used in the composition may be in an amount of less than 40 wt. %. In yet another embodiment, the amount of glass fiber used in the composition may be in an amount of more than 10 wt. %.

Flame Retardants: In one embodiment, flame retardants are added to the composition. Examples of flame retardants include, halogenated and non-halogenated flame retardants include, but are not limited to, like tretabromo bisphenol A oligomers such as BC58 and BC52, brominated polystyrene or poly(dibromo-styrene), brominated epoxies, decabromodiphenyleneoxide, pentabrombenzyl acrylate monomer, pentabromobenzyl acrylate polymer, ethylene-bis(tetrabromophthalimide, bis(pentabromobenzyl)ethane, metal hydroxides like Mg(OH)2 and Al(OH)3, triazine derivatives such as melamine, melam, melem and their salts, phosphor based FR systems like red phosphorus, melamine polyphosphate, phosphate esters, metal phosphinates, ammonium polyphosphates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate and N-(p-tolylsulfonyl)-p-toluenesulfimide potassium salt, N—(N'-benzylaminocarbonyl) sulfanylimide potassium salt, or a combination containing at least one of the foregoing. Fillers and additives may be added in amounts ranging from 0.1 to about 40% by weight percent of the total PTC composition.

Compatibilizing agent: A compatibilizer may be added into the first polymeric phase, the second polymeric phase or both. In one embodiment, a compatibilizer is added into first polymeric phase. In yet another embodiment, a compatibizer is added into second polymeric phase. Examples of compatibilizing agents include, but are not limited to, a modified polyolefin, a rubbery elastomer, or a functionalized rubbery elastomer, or blends thereof.

The modified polyolefin is, in one embodiment, a polyolefin copolymerized therewith an unsaturated monomer containing an acid, an acid anhydride, or epoxy group by any selected means. In another embodiment the modified polyolefin might be obtained by grafting a carboxylic acid or acid derivative or an epoxy thereto. In yet another embodiment, co- or terpolymers of polyolefins containing acrylate, alcohol or acetate groups. Examples are the ethylene alkyl-acrylate copolymers like ethylene methacrylate (EMA), ethyelene ethylacrylate (EEA), ethylene butylacrylate (EBA) and the MAH or GMA modified versions of these copolymers; ethylene vinyl acetate (EVA) copolymers as well as the MAH or GMA modified EVA. The functionalized rubbery elastomer is an elastomer functionalized with an acid, an acid anhydride, or epoxy group by any selected means.

As used herein, a "rubbery elastomer" means a rubbery high-molecular weight material, either natural or synthetic, showing elasticity at room temperature. The material can be either a homopolymer or a copolymer. Examples of copolymers and core-shell graft copolymers include AB (diblock) and ABA (triblock) copolymers and core-shell graft copolymers of alkenylaromatic and diene compounds, especially those comprising styrene and butadiene or isoprene blocks. The conjugated diene blocks may be partially or entirely hydrogenated, whereupon they may be represented as ethylene-propylene blocks or the like and have properties similar to those of olefin block copolymers. Examples of triblock copolymers of this type are polystyrene-polybutadiene-polystyrene (SBS), hydrogenated polystyrene-polybutadiene-polystyrene (SEBS), polystyrene-polyisoprene-polystyrene (SIS), poly(a-methylstyrene)-polybutadiene-poly(a-methylstyrene) and poly(a-methylstyrene)-polyisoprene-poly(a-methylstyrene).

Exemplary means for copolymerizing the modified polyolefins or functionalized rubber include melt kneading of the resin with the unsaturated monomer in a twin screw extruder, a Banbury mixer, a kneading machine, tubular reactors or the like in the presence or absence of a radical initiator, and copolymerization by the co-presence of the monomer constituting the polyethylene or the SEBS resin with the unsaturated monomer containing epoxy, carboxyl, or acid anhydride.

Exemplary unsaturated monomers containing an acid include, but are not limited to, acrylic acid, citraconic acid, aconitic acid, itaconic acid, citric acid, fumaric acid, methacrylic acid, maleic acid, cyclohexenedicarboxylic acid, and the like.

Exemplary acid anhydride groups include, but are not limited to, maleic anhydride, itaconic anhydride, citraconic anhydride, cyclohexenedicarboxylic anhydride, and the like. Exemplary epoxy-containing unsaturated monomers include glycidyl methacrylate, butylglycldyl malate, butylglycidyl fumarate, propylglycidyl malate, glycidyl acrylate, N-[4(2,3-epoxypropoxy)-3,5-dimethylbenzyl]acrylamide, and the like.

Exemplary epoxy-containing unsaturated monomers include, but are not limited to, glycidyl methacrylate, butylglycidyl malate, butylglycidyl fumarate, propylglycidyl malate, glycidyl acrylate, N->4-(2,3-epoxypropoxy)-3,5-dimethylbenzyl!-acrylamide, and the like. Among these, the preferred are glycidyl methacrylate and N->4-(2,3-epoxypropoxy)-3,5-dimethylbenzyl!acrylamide in view of their price and availability.

In one embodiment, the compatibilizer is present in an amount of 1 to 10 wt. %. In another embodiment, the compatibilizer is present in an amount of 1 to 8 wt. %. In still another embodiment, the compatibilizer is a modified polyolefin in an amount of less than 6 wt. % of the total weight of the composition.

In one embodiment of a modified polyolefin or a modified rubbery elastomer, the acid, the acid anhydride, or the epoxy group may be present at a content in the range of from 0.01 to 10% by weight of the polyolefin or rubbery elastomer resin.

Optional Additive Component: In alternative embodiments, other customary additives may be added to all of the resin compositions at the time of mixing or molding of the resin in amounts that do not have any deleterious effect on physical properties. For example, coloring agents (pigments or dyes), heat-resistant agents, oxidation inhibitors, organic fibrous fillers, weather-proofing agents, antioxidants, lubricants, mold release agents, flow promoters, plasticizer, coupling agents like silanes titanates and zirconates and fluidity enhancing agents, and the like, commonly used in thermoplastic compositions may also be added in beneficial amounts.

It should be clear that the invention encompasses reaction products of the above-described compositions.

Method for Manufacturing the Composition: In one embodiment of the invention, the method comprises, blending a first phase polymeric material with a conductive filler to form a first phase conductive polymeric material. Blending can be done by melt-blending or solution blending. Melt blending of the composition involves the use of shear force, extensional force, compressive force, ultrasonic energy, electromagnetic energy, thermal energy or combinations including at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations including at least one of the foregoing.

Melt blending involving one of the aforementioned forces may be conducted in machines such as, single or multiple screw extruders, Buss kneader, Eirich mixers, Henschel, helicones, Ross mixer, Banbury, roll mills, molding machines such as injection molding machines, vacuum forming machines, blow molding machines, or the like, or combinations including at least one of the foregoing machines.

The composition may be manufactured by a number of methods. In one embodiment, the composition is manufactured by mixing a first phase material, which may be semicrystalline in nature, with an effective amount of conductive filler to generate a substantially continuous conductive network and mixing the conductive network formed material with a second phase material such that the migration of conductive filler particle from the first phase polymeric material to the second phase polymeric material is substantially low and the resulting composition will have a substantially distinct co-continuous phase characteristic of immiscibility.

In another embodiment, the first phase polymeric material and or the second phase material, conductive filler, and additional optional ingredients are compounded in an extruder and extruded to produce pellets. In another embodiment, the composition is mixed in a dry blending process (e.g., in a Henschel mixer) and directly molded, e.g., by injection molding or any other suitable transfer molding technique. In yet another embodiment, the conductive first phase material is mixed in a dry-blending process with the second phase material and directly molded, e.g. by injection molding or any other suitable transfer molding technique.

In yet another embodiment of the invention, at least a first phase polymer is first melt-blended with the conductive filler to form a first blend of a master batch pellets. In a second step, the master batch pellets produced can be further compounded (melt-blended) with at least a matrix polymer having high heat distortion temperature, yielding granules or pellets or sheets or shaped briquettes of co-continuous polymeric PTC compositions.

In another embodiment of the invention, the first phase polymer is blended with the conductive filler to form a first phase PTC material. In a second step, the first PTC material is compounded (melt-blended) with at least a second phase polymer, yielding granules or pellets or sheets or shaped briquettes of conductive polymeric compositions. In yet another compounding step, the PTC materials are fed using a separate feeder from the second polymer, via a side feeder or a feeder downstream from the feeder for feeding the matrix polymer.

The composition can be extruded into granules or pellets, cut into sheets or shaped into briquettes for further downstream processing. The composition can then be molded in equipment generally employed for processing thermoplastic compositions, e.g., an injection-molding machine.

Articles from the Composition The compositions may be made into articles using common processes such as film and sheet extrusion, injection molding, gas-assisted injection molding, extrusion molding, compression molding and blow molding. The composition may be used to prepare molded articles such as durable articles, structural products, and electrical and electronic components, and the like, particularly in articles such as self-controlled heaters, over-current protection devices, air conditioning units, automotive applications, such as heated seats, heated mirrors, heated windows, heated steering wheels, and the like, circuit protection devices, perfume dispensers and any other application in which a thermoplastic-based PTC material may be used.

All cited patents, patent applications, and other references are incorporated herein by reference in their entirety. The invention is further illustrated by the following non-limiting examples.

Examples #1-6

The co-continuous PTC materials were compounded on a Werner and Pfleiderer 25 mm co-rotating 10-barrel twin-screw extruder. The compounding process is split up into two separate compounding steps. In a first step the conductive phase of the co-continuous PTC material is compounded (PTC-1). The temperature profile used for this conductive material was with the lowest temperature of 20° C. being used at the throat of the extruder. The first heated barrel element set at 100° C., the second barrel set at 150° C. and all following barrels including the die, had the highest temperature of 190° C. To get to the co-continuous structures, this PTC-1 material was re-compounded together with Staramide AG7K (35 wt % GF PA66). The temperature profile for these compositions was 150° C. for the first heated barrel and all following barrels including the die at a temperature of 270° C. Typically all compositions were compounded at a screw speed of 300 rpm, the throughput was tuned in order to reach a torque of between 70 and 80 percent. Next the granules obtained were after pre-drying for 4 hrs at 80° C., injection molded on an Engel 75 into tensile bars, impact bars and color plaques of 60*60*2.5 mm, using the following settings. Hopper at 50° C., 1st zone set at 270° C., 2nd zone at 275° C., 3rd zone set at 280° C. and the die at 280° C. with a mold temperature of 70° C.

Examples #7-10

In a first step the flame-retardant PTC formulation PTC-FR-1 was compounded on a Werner and Pfleiderer 25 mm co-rotating 10-barrel twin-screw extruder. The temperature profile was the same as used for the PTC-1 material described in the examples #1-4. In the next step the PTC-FR-1 and Starflam RF1007 (35 wt % GF FR PA66) granulate were premixed in the right ratios and after pre-drying for 4 hrs at 80° C. directly injection molded (Engel 75) using the following settings. Hopper at 50° C., 1st zone set at 260° C., 2nd zone at 265° C., 3rd zone set at 270° C. and the die at 270° C. with a mold temperature of 70° C.

Heat deflection temperature or heat distortion temperature (hereinafter referred to as "HDT") is a measure of the heat deflection temperature under a load and was measured in accordance with procedure defined by ISO 75/Be.

PTC effect was measured using static and dynamic test. Samples for the static test were prepared as follows; Tensile bars were notched at the inclination point, cooled to −40° C. and broken, after which silver paint is applied. In static test, a temperature was forced upon the material and the resulting resistivity was measured. The oven temperature was raised in steps of 20° C. prior to the onset of the PTC effect and in steps of 5-10° C. just before and after the onset. Only around the PTC temperature large changes of the resistivity vs. temperature occurred. As such initially larger incremental steps in temperature were employed which upon nearing the PTC temperature were reduced and increased after the PTC effect had occurred. To ensure a homogeneous well-through heated sample, a conditioning time of 40 min was applied after each stepwise raise in temperature. Two different methods were employed to measure the resistance of the samples. Either the resistance was measured immediately after opening of the oven, without removing the sample from the oven. This measurement was completed within a few seconds. In a later stage a special sample holder was designed, which allowed the samples to remain in the closed oven and measure the resistance of the samples outside the oven.

Properties of the Composition: The effective specific volume resistivity (SVR) was calculated according to:

$$SVR(\text{Ohm} \cdot \text{cm}) = \frac{\text{Resistance (Ohm)} * \text{Fracture area (cm}^{\wedge}2)}{\text{Length of sample (electrode distance)(cm)}}$$

The electrically conducting polymeric composites of the present invention have an electrical volume resistivity at room temperature of $1 \times 10^4$ ohm-cm, or less. In another embodiment, the electrically conducting polymeric composites of the present invention have an electrical volume resistivity at room temperature of $1 \times 10^3$ ohm-cm or less. In still another embodiment, the electrically conducting polymeric composites of the present invention have an electrical volume resistivity at room temperature of $1 \times 10^2$ ohm-cm or less In one embodiment, the compositions of the present invention have a surface resistivity of $1 \times 10^2$ ohm/square or greater. In another embodiment, the compositions of the present invention have a surface resistivity of $1 \times 10^3$ ohm/square or greater. In still another embodiment, the compositions of the present invention have a surface resistivity of $1 \times 10^4$ ohm/square or greater.

Rx/R23 was used as a measure for the magnitude of the PTC effect, were Rx denotes the is the resistivity at temperature X. X was either the temperature were the resistivity was at its maximum, or was chosen in such way that the maximum increase in resistivity has already occurred.

the trip temperature is characterized as the onset temperature were the sharp increase in resistivity is observed in a temperature vs. Logaritmic volume resistvity plot. In this case this was taken as the last measurement point were $R_x/R_{23} < 5$.

With the dynamic measurement a voltage was applied over the sample and the temperature increase was measured over time. In these experiments, a constant voltage of 13 v was applied. Inside temperature was measured using a thermocouple placed in side the material from the side. For these dynamic tests, injection molded color plaques (thickness 2.5 or 3.2 mm) were used, which were prepared as follows; samples were sanded and upper and lower surface were painted with Ag-paint. Subsequently parts of ~50*50 mm were cut from these plaques. Copper wires were attached to the painted Ag-surface using Ag-paint. These copper wires were then connected to the (13V) power source.

Figure 1:
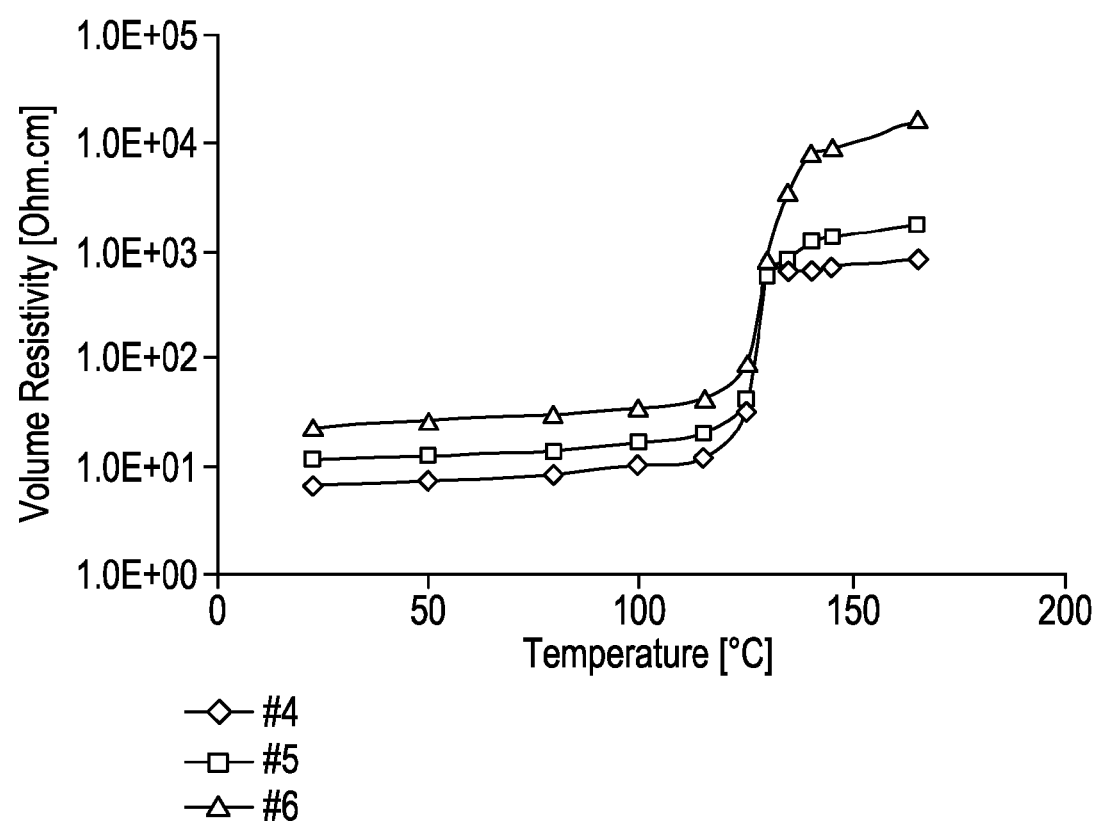

Results of the experiments #1-6 are displayed in Table 1 and FIG. 1, respectively. SEM and TEM measurements showed a co-continuous structure for the formulations #1, #2 and #3. However the resulting composition does not have a HDT higher as the trip temperature of the formulation even though the HDT of the PA66 (HDT(0.45 Mp)=210° C.) is higher. Surprisingly addition of more than 39 wt % Staramide AG7K, a 35 wt % GF reinforced PA66, instead of plain PA66 yielded materials with distinct raise in HDT, as a result of which the HDT is significantly higher as the trip temperature of this blend (formulations #5 and #6). A too low amount of GF reinforced PA66 does not raise the HDT significantly, probably due to the fact there is a dispersive rather than a co-continuous morphology. FIG. 1 displays the volume resistivity vs. temperature plot for these materials. When connected to a 13V power source, all materials quickly (2.5 mm electrode-spacing) heat-up and rapidly reach the trip temperature of ~120° C. and maintain this temperature during the duration of this experiment (10 min).

Figure 2:
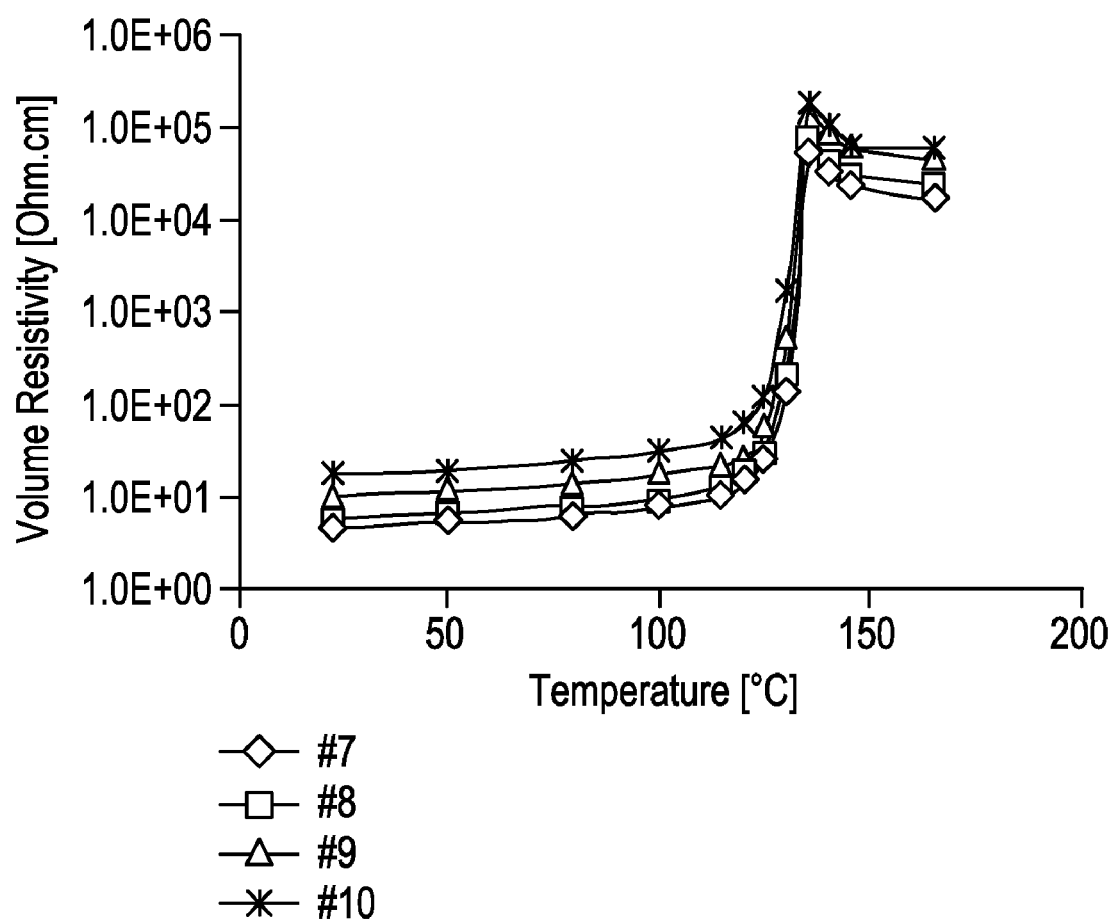
Figure 3:
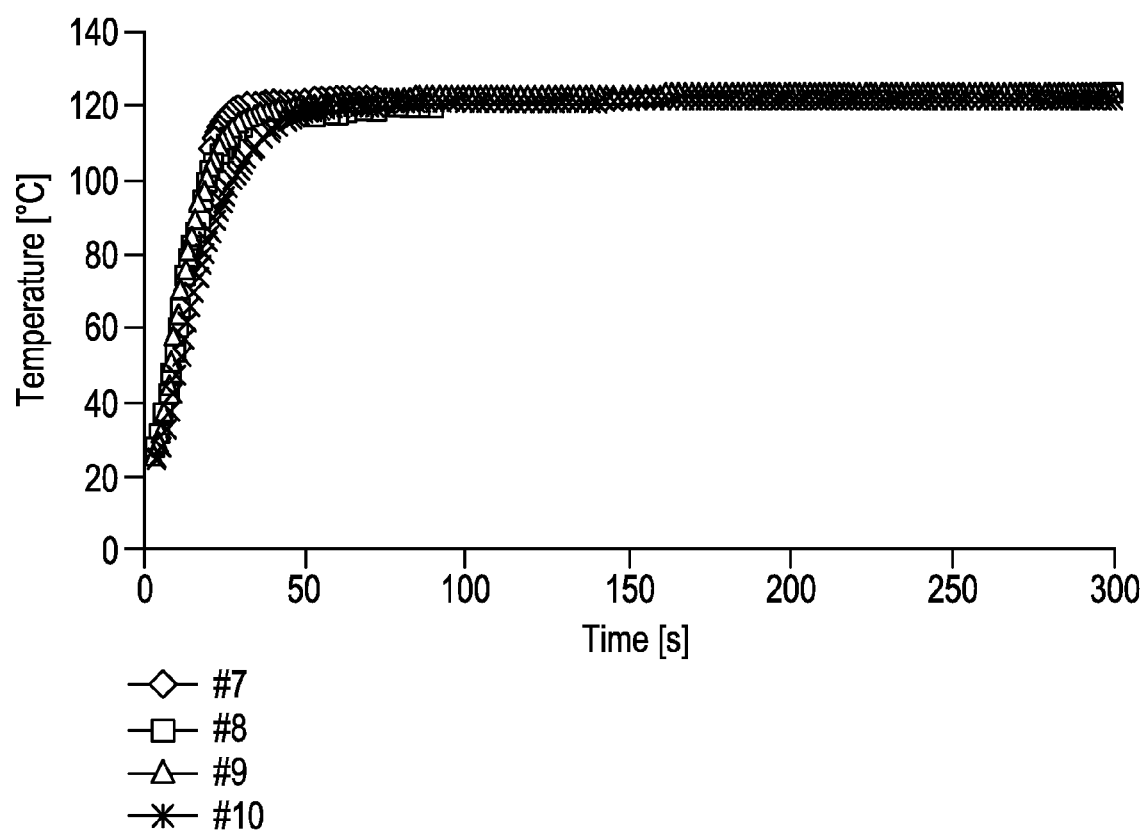
FIG. 3 displays the temperature versus time evolution for electrical conducting polymeric compositions when connected to a 13V power source.

Results of the experiments #7-10 are displayed in Table 2 and FIGS. 2 and 3, respectively. It is difficult to assess the co-continuous structure using SEM, but based on the results it seems that only at the higher loadings of Starflam RF1007 like those in formulations #9 and #10, a true co-continuous structure is formed that is able to support the load as exemplified by the raise in HDT. At lower loadings of Starflam RF1007 as in formulations #7 and #8, the HDT of resulting composition is not significantly higher as the trip temperature of the formulation. As such these materials do not fulfill the requirement that HDT-trip temperature should be >10° C. or preferably >15° C. as claimed in this patent application. FIG. 2 displays the volume resistivity vs. temperature plot for these blends. All materials rapidly heat-up when connected to a 13V power source (FIG. 3) and quickly reach the trip temperature and maintain this temperature during the duration of the experiment. In addition and worthwhile to point out the starting material as well as the blends have a V0 at 1.6 mm rating according to UL-94. Such V0 ratings are often required for electrical applications.

The formulations for the examples, the tests conducted and results thereof are presented in Table 1 below.

TABLE 1

| Material | | PTC-1 | #1 | #2 | #3 | #4 | #5 | #6 |
|---|---|---|---|---|---|---|---|---|
| Formulation | | | | | | | | |
| PTC-1 | | | 66 | 58 | 50 | 61 | 52.5 | 47.5 |
| PA 66 | | | 34 | 42 | 50 | | | |
| Staramide AG7K | | | | | | 39 | 47.5 | 52.5 |
| total | | | 100 | 100 | 100 | 100 | 100 | 100 |
| Properties | unit | | | | | | | |
| Thermal | | | | | | | | |
| HDT (0.45 Mpa) | ° C. | | 104 | 114 | 116 | 119 | 131 | 187 | 235 |
| PTC-characteristics | | | | | | | | |
| RT resistivity | Ohm · cm | 0.9 | 5.9 | 10 | 19.7 | 6.7 | 11.6 | 25.3 |
| $R_{140}/R_{23}$ | | | 5061 | 190 | 145 | 179 | 100 | 110 | 344 |
| Trip temperature | ° C. | 120 | 120 | 120 | 120 | 120 | 120 | 120 |

TABLE 2

| Material | | PTC-FR-1 | #7 | #8 | #9 | #10 |
|---|---|---|---|---|---|---|
| Formulation | | | | | | |
| PTC-FR-1 | | | 71.3 | 61.7 | 53.3 | 45.3 |
| Starflam RF1007 | | | 28.7 | 38.3 | 46.7 | 54.7 |
| total | | | 100 | 100 | 100 | 100 |
| Properties | unit | | | | | |
| Thermal | | | | | | |
| HDT (0.45 Mpa) | ° C. | 100 | 128.4 | 133.23 | 181.07 | 209.57 |
| UL-94 V0 at 1.6 mm | | pass | pass | pass | pass | pass |
| GWFI 960° C./1 mm | | pass | pass | pass | pass | fail |
| PTC-characteristics | | | | | | |
| RT resistivity | Ohm · cm | | 4.7 | 6.1 | 10.6 | 17.9 |
| $R_{135}/R_{23}$ | | | 11178 | 5865 | 3507 | 2160 |
| Trip temperature | ° C. | 120 | 120 | 120 | 120 | 120 |

The invention claimed is:

1. A conductive composition comprising a mixture of:
   a. a first phase polymeric material, showing positive temperature coefficient behavior, wherein a conductive filler is dispersed in the first phase polymeric material, and
   b. a non-conductive second phase polymeric material which has a heat deflection temperature higher than the heat deflection temperature of the first phase polymeric material, wherein the second phase polymeric material comprises at least one reinforcing fibrous filler;
   wherein the resulting conductive composition has a distinct co-continuous structure that exhibits positive temperature coefficient behavior and has a heat deflection temperature higher than the trip temperature of the composition.

2. The composition of claim 1, wherein the difference between the trip temperature and the heat deflection temperature of the composition is 10° C. or greater.

3. The composition of claim 1, wherein the difference between the trip temperature and the heat deflection temperature of the composition is 15° C. or greater.

4. The composition of claim 1, wherein the conductive filler is selected from carbon black, graphite, carbon fibers, metal powders and ceramic powders or a combination containing at least one of the foregoing conductive fillers.

5. The composition of claim 1, wherein the conductive filler is carbon black.

6. The composition of claim 1, wherein the conductive filler is present in an amount of 2 to 80 wt. % based on the total weight of the conductive composition.

7. The composition of claim 1, further comprising at least one flame retardant.

8. The composition of claim 1, wherein the first phase polymeric material is a crystalline or a semi-crystalline material.

9. The composition of claim 1, wherein the first phase polymeric material is a positive temperature coefficient material.

10. The composition of claim 1, wherein the first phase polymeric material is selected from a crystalline or semi-crystalline polymer including polyethylene terephthalate, polybutylene terephthalate, polyestercarbonate copolymers, poly(ester-carbonate) resins, polyamides, high temperature polyamides, polyethylene, polypropylene, copolymers of olefins, halogenated vinyl polymers, vinylidene polymers, polyvinylidene chloride, polyvinyl fluoride, polyvinylidene fluoride, polyamide copolymers, polyacrylonitrile, polyethers, polyketones, thermoplastic polyimides, modified celluloses, and mixtures including at least one of the foregoing polymeric materials.

11. The composition of claim 1, further comprises a compatibilizing agent.

12. The composition of claim 1, wherein the heat deflection temperature of the second phase polymeric material is higher than the trip temperature of the first phase polymeric material.

13. The composition of claim 1, wherein the second phase polymeric material is selected from polyamides, polyamines, polyimides, polyacrylics, polycarbonates, polysulfones, polydienes, polyepoxides, polyesters, polyethers, polyketones, styrinic resins, polyfluorocarbons, formaldehyde polymers, natural polymers, polyolefins, polyphenylenes, silicon containing polymers, liquid crystalline polymers, polyurethanes, polyvinyls, polyacetals, polyarylates, copolymers, or a combination comprising at least any of the forgoing polymers.

14. The composition of claim 1, further comprising one or more additives selected from fillers, reinforcing agents, plasticizers, heat stabilizers, ultraviolet stabilizers, tougheners, antistatic agents, colorants or a combination containing at least one of the foregoing additives.

15. The composition according to claim 1, wherein the first phase polymeric material and the second polymer polymeric material are crystalline polymers.

16. The composition according to claim 1, wherein the second phase polymeric material can be crystalline or amorphous polymers.

17. The composition of claim 13, further comprising glass fibers as the at least one reinforcing fibrous filler.

18. A method of making a polymeric positive temperature coefficient composition comprising;
   blending a first phase polymeric material with at least one conductive filler to form a conductive first phase polymeric material and
   blending the conductive first phase polymeric material with a non-conductive second phase polymeric material, wherein the second phase polymeric material comprises at least one reinforcing fibrous filler
   wherein the conductive first phase polymeric material is co-continuous with the second phase polymeric material, such that the trip temperature of the conductive first phase polymeric material is less than the heat deflection temperature of the second phase polymeric material.

19. An article comprising a composition made by the method of claim 18.

* * * * *